United States Patent [19]

Howard

[11] 4,089,118
[45] May 16, 1978

[54] COURSE INDICATOR

[76] Inventor: Bernard Howard, 73 McKinley Ave., New Haven, Conn. 06515

[21] Appl. No.: 695,832

[22] Filed: Jun. 14, 1976

Related U.S. Application Data

[63] Continuation-in-part of Ser. No. 536,208, Dec. 24, 1974, abandoned, which is a continuation-in-part of Ser. No. 407,613, Oct. 18, 1973, abandoned.

[51] Int. Cl.² ............................................. G01C 17/14
[52] U.S. Cl. ..................................... 33/349; 33/355 R
[58] Field of Search .......................... 33/349, 355, 356

[56]  References Cited
U.S. PATENT DOCUMENTS

| | | | |
|---|---|---|---|
| 1,332,027 | 2/1920 | Bunker | 33/349 |
| 2,014,024 | 9/1935 | Leatherman | 33/349 |
| 2,855,696 | 10/1958 | Griswold | 33/349 |
| 3,177,591 | 4/1965 | Jolley | 33/356 |

FOREIGN PATENT DOCUMENTS

| | | | |
|---|---|---|---|
| 246,650 | 2/1926 | United Kingdom | 33/356 |
| 4,761 of | 1912 | United Kingdom | 33/349 |

Primary Examiner—Richard E. Aegerter
Assistant Examiner—Richard R. Stearns
Attorney, Agent, or Firm—DeLio and Montgomery

[57]  ABSTRACT

A course indicator including a marker which is normally movable following a compass and which may be automatically set to a reference position in alignment with a lubber line upon command. Thereafter, the marker will indicate any deviation from the course upon which it was set.

43 Claims, 24 Drawing Figures

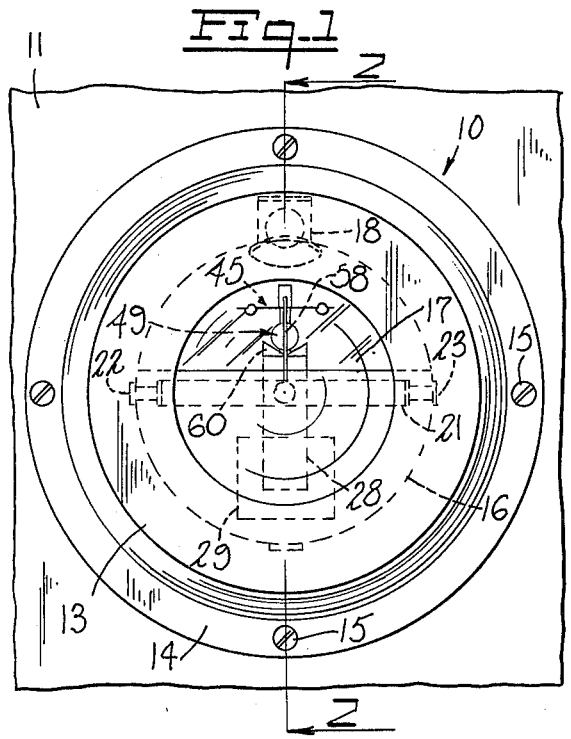
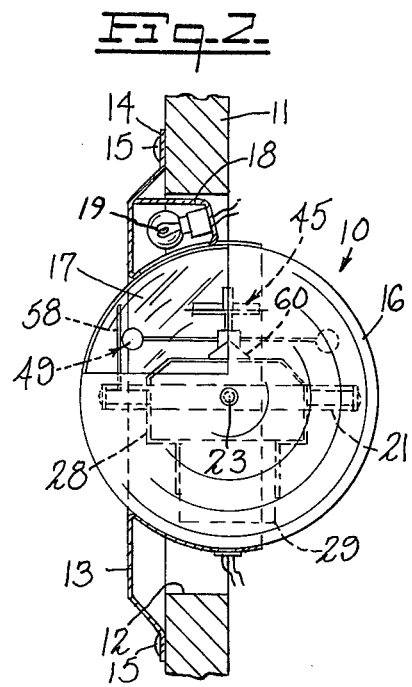
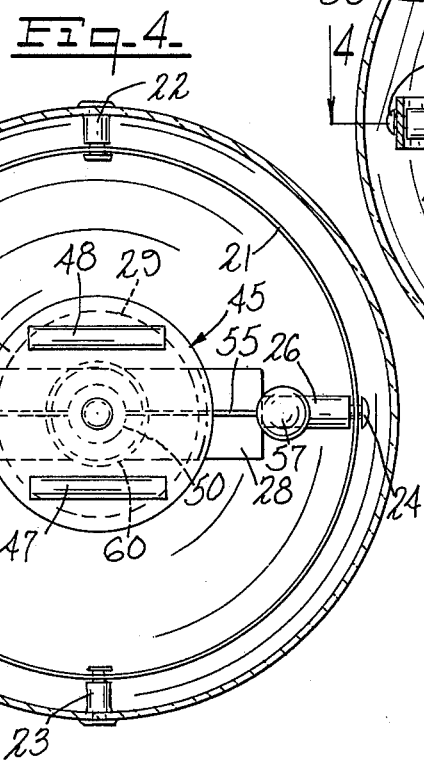
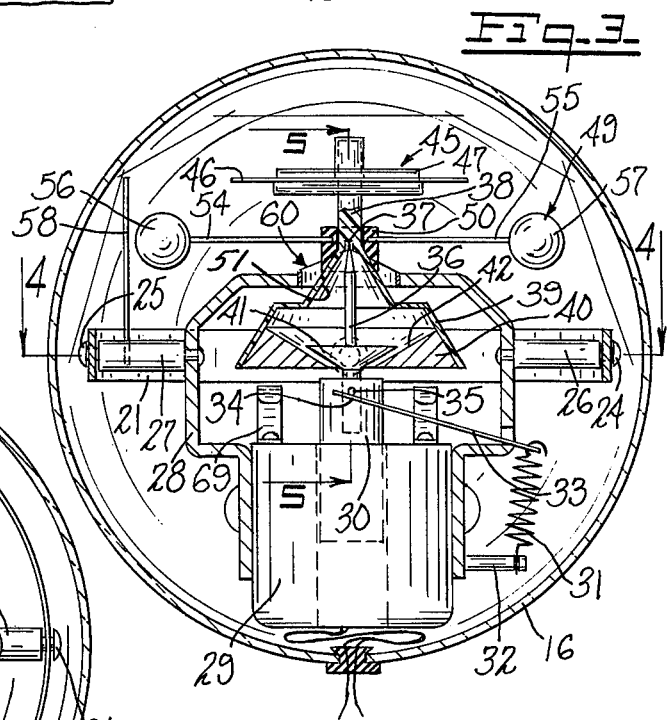

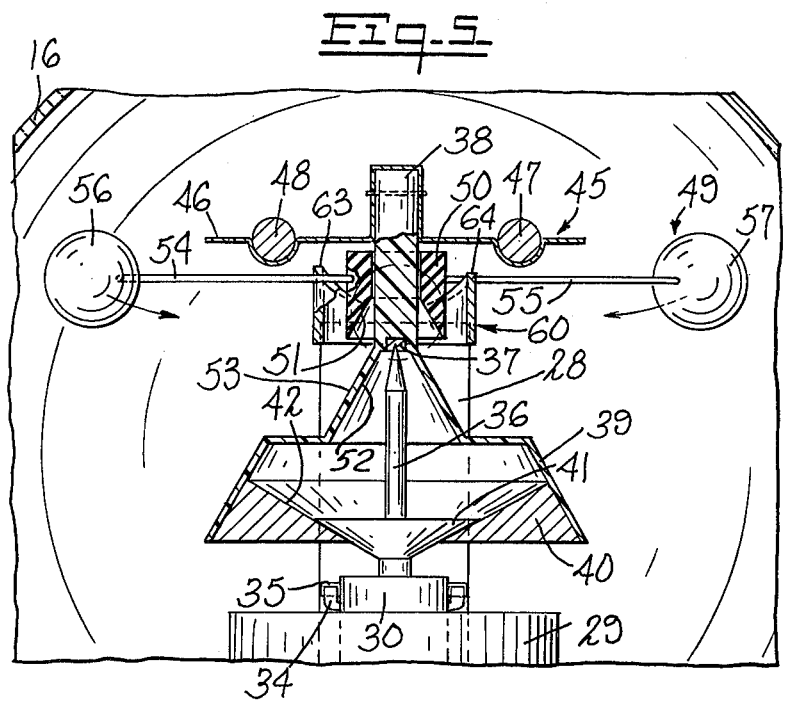
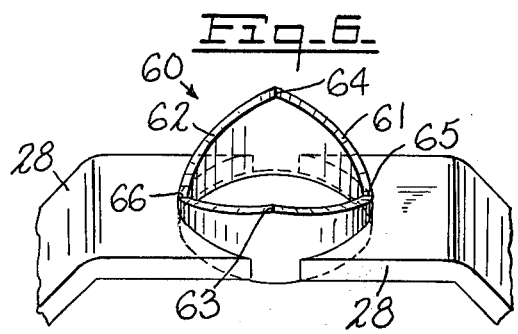
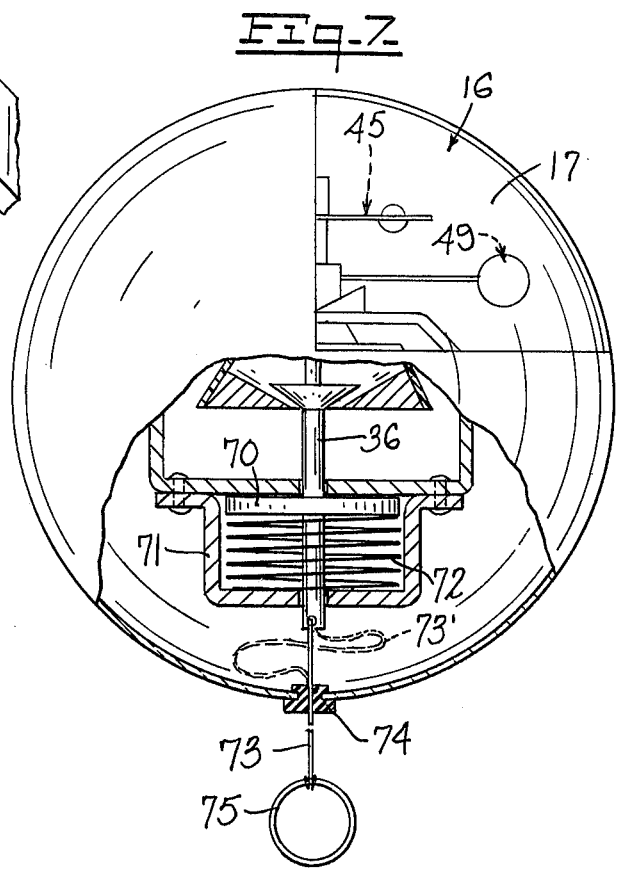
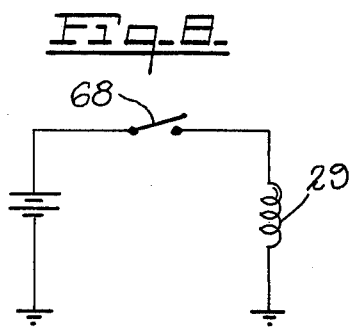

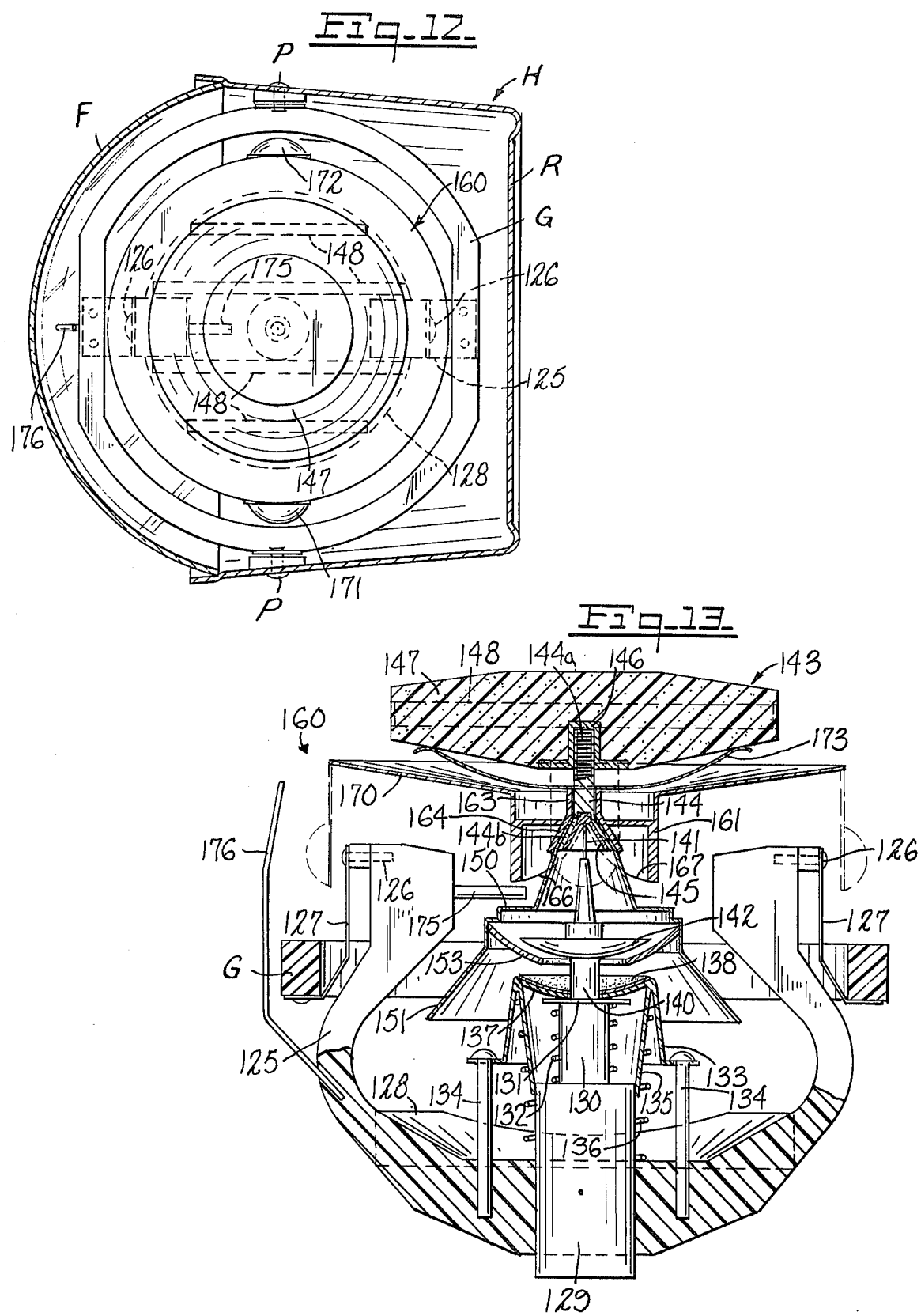

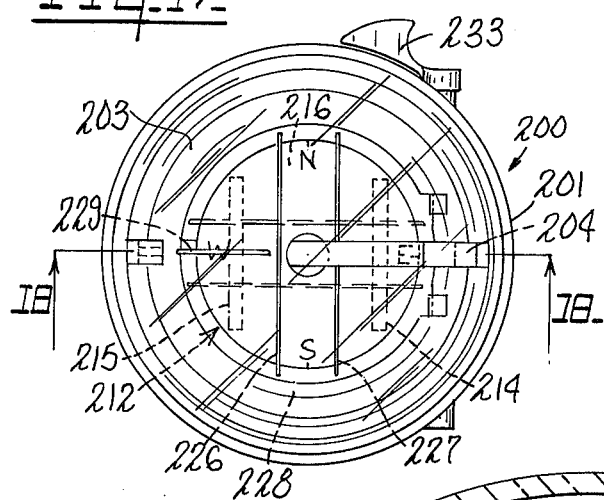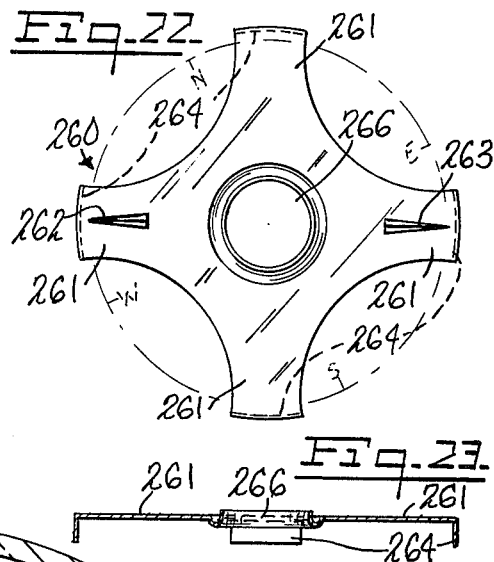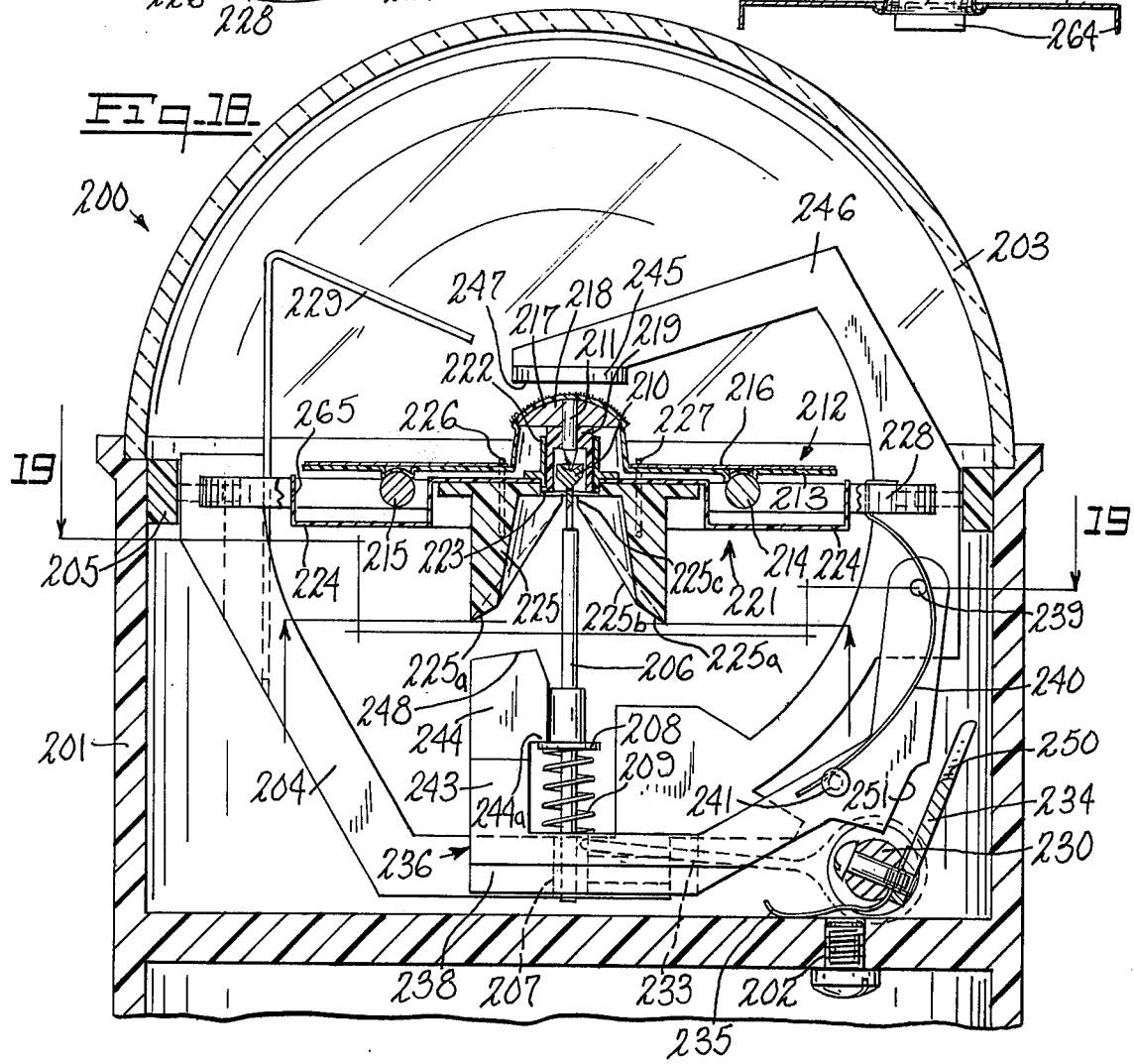

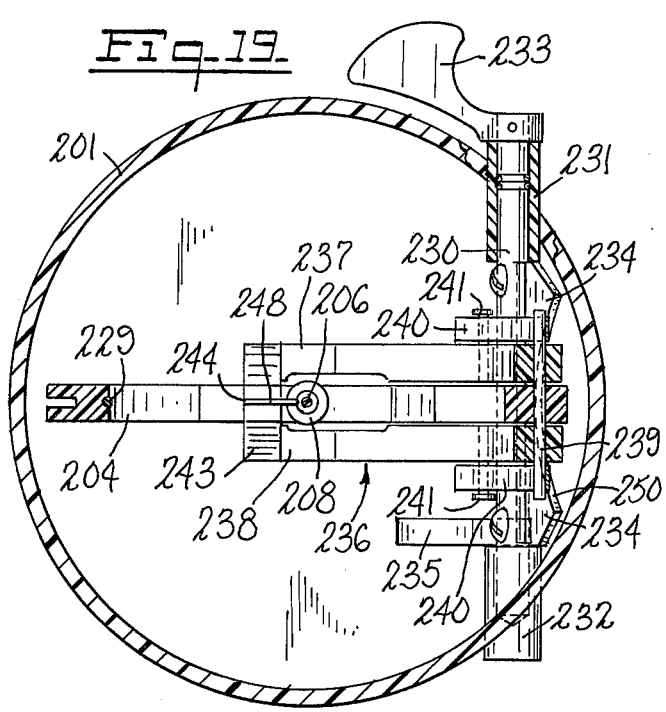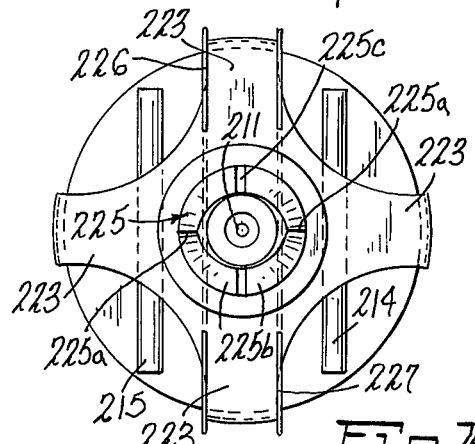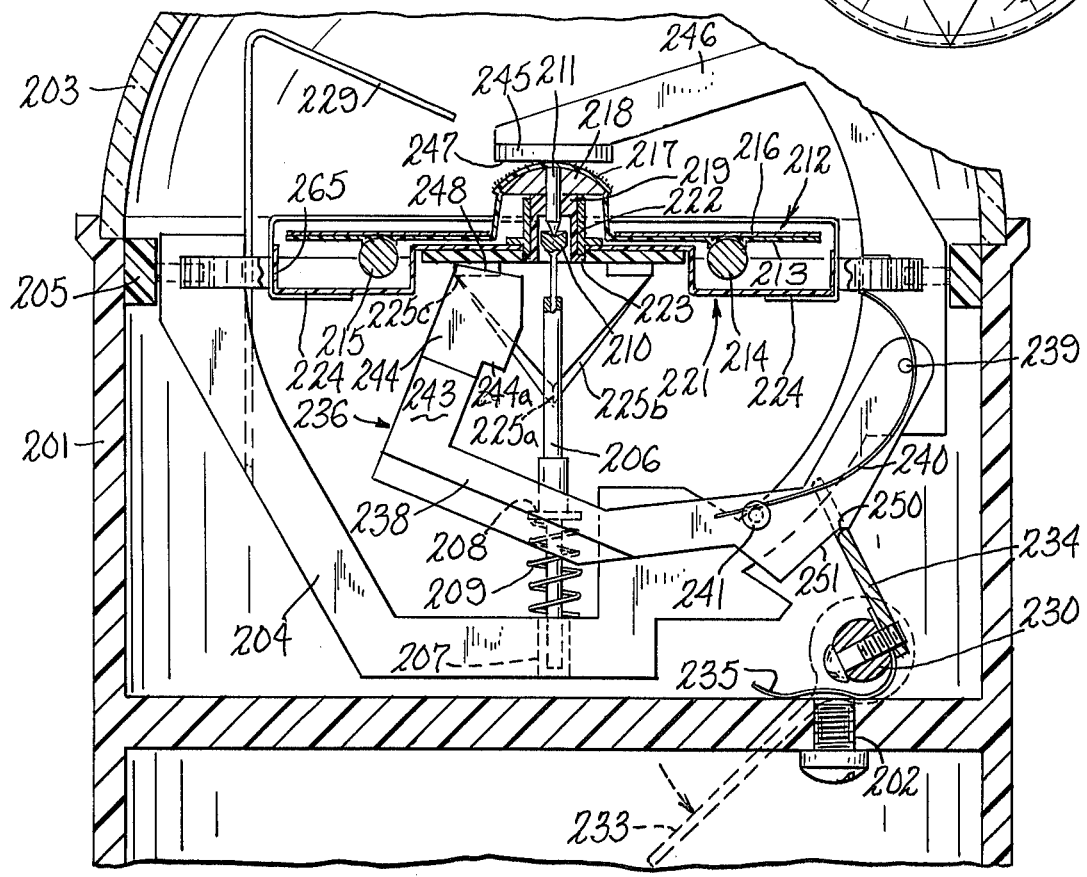

COURSE INDICATOR

This application is a continuation-in-part of application Ser. No. 536,208, filed Dec. 24, 1974, now abandoned, which was a continuation-in-part of application Ser. No. 407,613, filed Oct. 18, 1973, now abandoned.

This invention relates to course indicators and more particularly relates to course indicators which may be automatically set to a given position of a compass.

In the use of compasses to follow a given direction or heading, when a course in degrees is selected, the helmsman steers the course by means of the position of the compass card or rose thereon with respect to a reference, generally referred to as a lubber line. Such use of the compass to maintain the ship on a given course is very tiring on the helmsman, and the helmsman may become confused as the ship may, for a variety of reasons, depart from the chosen course, and also because he must keep verifying that the selected course heading is aligned with the lubber line. This may become very fatiguing and uncomfortable to the helmsman, particularly where he has only limited experience.

Additionally, on most private ships, the compasses are fairly small in diameter and the displays used thereon are often fatiguing to view for any length of time, particularly where the compass is mounted in such a manner that the helmsman must periodically look down at the compass to verify the continuation of a particular course and look up for steering or viewing purposes.

Accordingly, the present invention provides a new and improved course indicating device that may be mounted in any position on the vessel and automatically set to indicate a course heading when such course heading is achieved. This permits the helmsman to initially being the vessel to a desired heading as by means of his primary compass. At this point he may merely depress a switch button to automatically activate the indicating device. This indicating device, which may take several forms for display purposes, comprises a rotatable indicator which is automatically set on a reference or lubber line when the device is actuated.

Briefly stated, the invention is one form thereof comprises an assembly which is rotatable to follow a compass card, and is both rotatable and slidable upon a shaft carrying a directional indicator. The indicating assembly is normally in frictional engagement with an assembly which rotates in accordance with a compass and rotates therewith. Means are provided such that when the shaft is moved axially with respect to the indicating assembly, the indicating assembly will engage or be engaged by a self-setting means and turn to a position in which an indicator is aligned with a lubber line. Upon return of the shaft to its normal position the indicating assembly is in frictional engagement therewith and will move with the shaft.

An object of this invention is to provide a new and improved course indicator.

Another object of this invention is to provide a course indicator having new and improved means for setting the indicating means in alignment with a lubber line for a selected position of a compass.

A further object of this invention is to provide a new and improved course indicator which may be remotely actuated to automatically self-position itself to an achieved compass course.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIG. 1 is a front elevation view of a course indicator embodying the invention as it may be mounted to a bulkhead;

FIG. 2 is a view seen in the plane of lines 2—2 of FIG. 1;

FIG. 3 is an enlarged view of the interior of the device as shown in FIG. 2;

FIG. 4 is a top view seen in the plane of lines 4—4 of FIG. 3;

FIG. 5 is a view seen in the plane of lines 5—5 of FIG. 3;

FIG. 6 is an enlarged view of an automatic centering device utilizing the invention shown in perspective;

FIG. 7 is a view of a device embodying the invention partially cut away to show another mode of actuation thereof;

FIG. 8 is a schematic diagram of an actuating circuit;

FIG. 12 is a top plan view of another embodiment of the invention;

FIG. 13 is a side half-sectional view of the device of FIG. 12 with case removed;

FIG. 17 is a top plan view of another embodiment of the invention;

FIG. 18 is a view seen in the plane of lines 18—18 of FIG. 17;

FIG. 19 is a view seen in the plane of lines 19—19 of FIG. 18;

FIG. 20 is a view similar to FIG. 18, but showing operating mechanism in a different position;

FIG. 21 is a bottom view of the indicator of FIGS. 17-20;

FIG. 22 is a top view of an alternate indicator;

FIG. 23 is a sectional view of the indicator of FIG. 22; and

FIG. 24 is a top view of another indicator which may be utilized in the invention.

Figure 11:
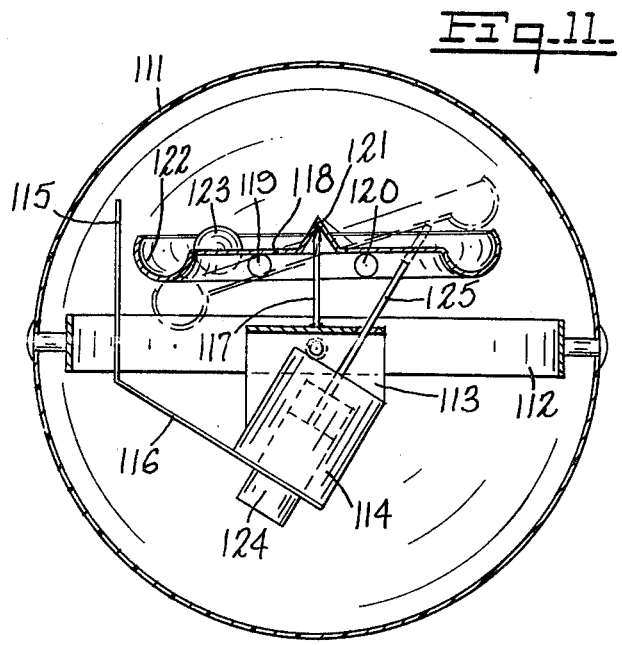
FIG. 11 is a view in half section of still another embodiment of the invention.

FIGS. 1 and 2 exemplify the device 10 as would be seen mounted to the bulkhead of a ship. The device is mounted in a bulkhead or wall 11 through a cutout 12 therein. The device 10 is suppported in a mounting bracket 13 having an annular flange 14 which is bolted, or otherwise secured, as indicated at 15. The device is preferably mounted in a plastic housing 16 which is opaque except for a quadrant or other portion 17 thereof which provides a viewing window. A compartment 18 is defined in mounting member 13 to house a lamp 19 for purposes of illumination, as will hereinafter be made apparent. A first gimbal ring 21 is pivotally mounted within housing 16 by pins 22 and 23 supported from housing 16. A mechanism embodying the invention is further pivotally mounted as by means of pins 24 and 25 to gimbal ring 21 so as to permit two coordinate axes of rotation in a usual manner. The pins 24 and 25 are carried on support members 26 and 27 which extend from a frame 28. Mounted to the lower portion of frame 28 is a solenoid assembly 29 having a plunger 30 adapted to be retracted when the solenoid is energized. The plunger is normally biased upward as by means of a spring 31 attached between a support member 32 and a lever 33. Lever 33 has a bifurcated end 34 which engages a pin 35 extending through plunger 30. Pin 35 also fastens a bearing shaft 36 to plunger 30. The spring 31 provides a means for maintaining bearing shaft 36 and plunger 30 in a upper position. Pivotally mounted on bearing shaft 36 is a compass assembly, hereinafter described.

The bearing shaft 36 on the bearing point thereof is received in a small jewel bearing 37 carried on or in a compass shaft 38. A skirt-like member 39 is affixed to the lower end of compass shaft 38 and extends downwardly therefrom. Supported within the skirt 39 is a weighted annular member 40 provided for ballast purposes. A clutch-like member 41 is affixed to shaft 36 and is adapted to act on surfaces 42 on ballast 40, retract member 39 and ballast 40 with shaft 36 when the solenoid plunger 30 is retracted. A compass card 45 which may comprise a disc-like member 46 carrying a pair of bar magnets 47 and 48 is affixed to compass shaft 38 and rotates therewith. A float (not shown) may be incorporated on the card. An indicating device 49 comprises a hub member 50 having a lower surface 51 complementary to the surface 52 (FIG. 5) of upper portion 53 of skirt-like member 39. Surface 51 is in frictional engagement with surfaces 52. Extending from diametrically opposite sides of hub member 50 are rods 54 and 55 each carrying an indicating marker or ball 56 and 57, respectively, on the end thereof. A reference rod 58 serving as a lubber line is supported on and extends upwardly from support member 27. A positioning device 60, as more clearly seen in FIG. 6, is carried by frame 28 and provides camming surfaces 61 and 62 terminating in ridges 63 and 64. Positioning device 60, as will hereinafter be made apparent, will automatically position the indicating device 49 upon command. In the arrangement thus far described, the member 50 is slidable with respect to compass shaft 38 and is also rotatable with respect thereto when surface 51 thereof is disengaged from surface 52 of skirt-like member 39.

In normal operation, compass card 45, shaft 38 and the depending skirt 39 are free to rotate upon bearing 36, and indicating assembly 49 will normally rotate therewith when surfaces 51 and 52 are in engagement.

However, when solenoid 29 is actuated and plunger 30, together with bearing shaft 36, are retracted as shown more clearly in FIG. 5, clutch member 41 will engage ballast 40 and pull it downwardly together with compass shaft 38. When compass shaft 38 moves downwardly the rods 54 and 55 will engage guide means in the form of camming surfaces 61 and 62 between ridges 63 and 64 and will ride down such surfaces and rotate member 50, as indicated in FIG. 5, until the shafts 54 and 55 rest in the bight portions 65 and 66 of positioning device 60. At this time, one of the indicators 56 and 57 will be aligned with lubber line 58, as exemplified in FIG. 1. When this occurs the solenoid is de-energized and spring 31 will bring plunger 30 back to the position shown, and hub 50 of indicating device 49 will again rest on surfaces 52 of skirt member 39, and will rotate with compass card 45. The positioning device may simply be cut out of a section of tubing and one of the ridges 63 or 64 is made slightly higher than the other so that there is no danger of the rods assuming a static position on the ridges.

In operation, when the helmsman of a ship has reached a desired course as read from his primary compass, compass card 45 will follow the primary compass. At this time, the helmsman may merely close a switch 68 to energize solenoid 29. This will retract plunger 30 and bearing shaft 36 as previously described. Rods 54 and 55 will move with shaft 36 until the rods engage camming surfaces 61 and 62. Then as bearing shaft 36 is further retracted the indicating mechanism will move on the camming surfaces 61 and 62 to the bight portions 65 and 66 thereof. Upon de-energization of the solenoid, the plunger thereof and shaft 36 will again rise to the position shown in FIG. 3 and the rods 54 and 55 together with the indicating balls 56 and 57 will be aligned with the lubber line 58.

If there should be any deviation from the desired position the compass card 45 will pivotally follow magnetic north and the indicating assembly will pivot therewith, and one of the markers 56 or 57 will depart from alignment with lubber line 58. This will give the helmsman an immediate indication of any deviation from the desired course and he may merely steer to again align one of the markers 56 or 57 with lubber line 58. The helmsman does not have to again resort to the compass. This is a particular benefit where a device embodying the invention is mounted in front of the helmsman. At such time, he may always have a view of where he is steering as well as the indication that he is on course or off course and the degree of magnitude by which he is off course.

When the bulkhead is mounted as shown in FIGS. 1 and 2, the lamp 19 will always illuminate the marker ball 56 and the lubber line 58.

If desired, only a small viewing window may be defined in quadrant 17, the indicator ball 56 and lubber line may be suitably colored to insure easy viewing. It will also be apparent that the markers 56 and 57 shown as balls may take any form such as arrows, etc. The compartment 16 generally comprises two hemispheres which are sealed together and filled with the usual compass damping fluid.

Resilient braking means in the form of leaf springs 69 may be mounted on the housing of solenoid 29, or alternatively on frame member 28, to engage the compass assembly and prevent any rotation thereof during a centering operation. As shown in FIG. 3, when the compass assembly is retracted, the ballast 40 engages springs 69 which are compressed and frictionally brake the compass assembly against rotation. It will be apparent that when the compass assembly is braked against rotation, relative axial movement between the centering device and the indicating device will rotate the indicating device to the alignment position.

FIG. 7 exemplifies another embodiment of the invention in which the automatic setting of the indicator is manually actuated. Instead of the solenoid 29, a spring-seat disc 70 is provided on shaft 36 and an additional housing member 71 enclosing a spring 72 about shaft 36 is affixed to frame 28. A flexible wire or string 73 is affixed to the end of the shaft 36 and extends out of housing 16 through a seal 74. A finger ring 75 or other device which may be grasped with the finger is attached to string 73. The device of FIG. 7 is actuated by merely pulling downwardly on ring 75 to retract bearing shaft 36 as previously described. Sufficient length of the wire 73 may be provided as indicated in dotted line at 73'to insure that the wire will not interfere with the motion of the device on the gimbals. The housing 16 may contain a sealable opening adjacent the top thereof (not shown) to permit it to be filled with the compass damping liquid and also may have a bellows in communication with the interior of housing 16 (not shown) in the rear thereof to compensate for any expansion or contraction of such liquid.

The embodiment described provides a compass course indicator having an indicating means which may be automatically set to an achieved course and thereafter will indicate the heading of the vessel in relation to the course, and provide an easy indicator for the helmsman to follow to remain on course.

A device embodying the invention may be mounted at any part of a ship, and a plurality may be used, and all simultaneously set to indicate a desired course.

The embodiment of the invention thus far disclosed provides a simple and economical construction for automatically aligning the indicator utilizing gravity. The axial movement of the indicator on the compass assembly may be relative. For example, the centering device 60 could be made to be movable upwardly from frame 28 to engage the rods 54 and 55 and turn hub 50 on shaft 38. Other mechanically actuated devices may be employed to provide the rotative movement of the indicator assembly with respect to the compass assembly.

Figure 9:
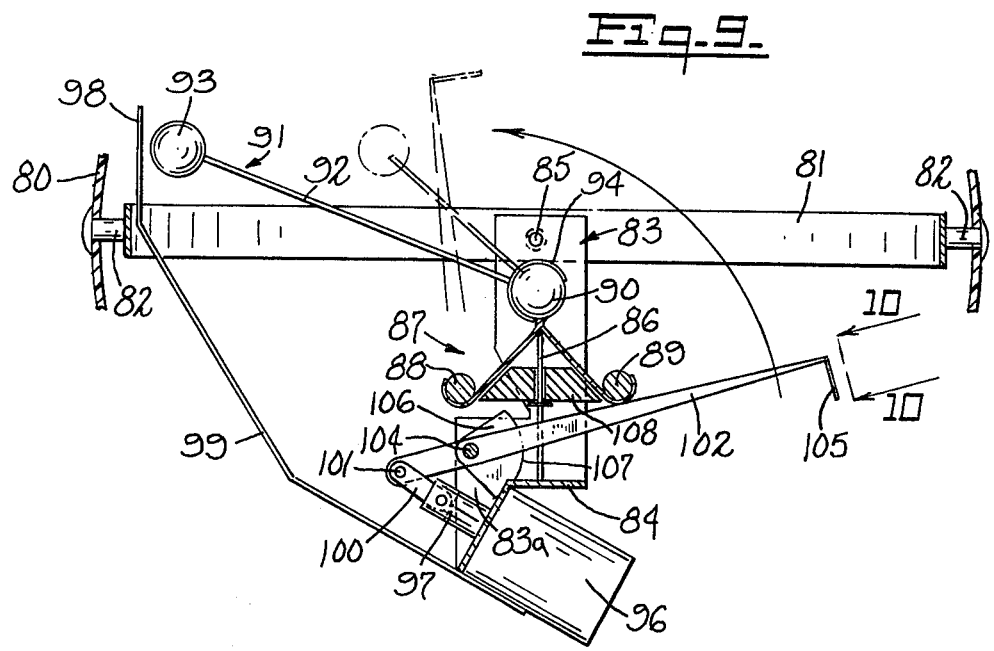
FIG. 9 is a vertical half-sectional view through another embodiment of the invention with portions of the housing removed.
Figure 10:
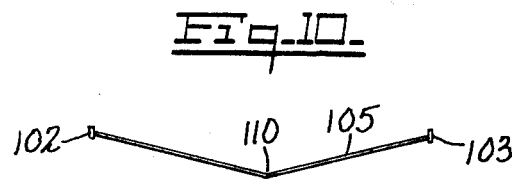
FIG. 10 is a view seen in the plane of lines 10—10 of FIG. 9.

A further embodiment of the invention is shown in FIGS. 9 and 10. This embodiment comprises a housing member 80 (only partially shown) having a gimbal ring 81 pivotally mounted thereto on pins 82. A support or frame member 83 of generally U-shape having a lower platform portion 84 is pivotally mounted to ring 81 at diametrically opposite points as at 85. Extending upwardly from platform member 84 is a bearing shaft 86 which is received in a jewel (not shown) on a compass assembly 87. The assembly 87 carries a pair of magnets 88 and 89 and is pivotal on shaft 86. Affixed to the upper end of assembly 87 is a ball 90. An indicator assembly 91 comprises a rod 92, a viewing marker in the form of a ball 93 and a partial hemispheric connection member 94 which frictionally engages ball 90. Ball 90 and connection 94, in essence, form a universal joint.

A solenoid 96 having a plunger 97 is carried on frame 83. A reference marker 98 is carried on or forms part of an extending member 99 also carried on frame 83. The plunger 97 has attached thereto a link 100 which is connected to a rod 101 extending between a pair of spaced apart arms 102 and 103. Arms 102 and 103 are arranged to pivot about on a pin or shaft 104 extending across frame 83. The ends of arms 102 and 103 are connected by a shallow V-shaped member 105. Pin 104 is pivotal in arms 83a on frame 83 and fastened to arms 102 and 103.

The arms 102 and 103 are spaced apart a sufficient distance such that when they move to the position shown in broken line in FIG. 9, they will clear the compass assembly. A braking member 106 pivots with shaft 104 and has a curved lifting surface 107 adapted to engage the underside of a compass braking member 108 which is movable axially on shaft 86. When solenoid 96 is energized the plunger 97 thereof is retracted. This causes arms 102 and 103 to move in the direction of the arrow towards the position shown in broken line. As the arms 102 and 103 move, one or the other may engage shaft 92. On continued movement of arms 102 and 103, shaft 92 will move towards the apex point 110 of member 105 which will bring ball 93 into alignment with reference marker 98. Both reference marker 98 and bearing shaft 86 are intermediate the arms 102 and 103, and perpendicular to the axis of shaft 104. The connecting member 105 provides camming surfaces which move the rod 92 to the bight or apex 110.

Thereafter the indicating member will rotate with compass assembly 87. When the arms 102 and 103 are pivoted, the surface 107 of member 106 will first engage brake member 108 and slide it up against the underside of the compass assembly, thereby holding the compass against rotation while the indicator assembly is set. Continued movement will merely cause the curved surface 107 to move along the underside of member 108. The extending rod 92 and indicator ball 93 present no problem from the standpoint of providing a torque arm on the compass inasmuch as the housing will be filled with the usual compass damping fluid and the ball 93 may be made of a floatation material.

Still another embodiment of the invention is shown in FIG. 11. This embodiment includes housing 111 having a pivotally mounted gimbal ring 112. A support member 113 is pivotally mounted diametrically across ring 112. A support member 113 is pivotally mounted diametrically across ring 112 and carries a solenoid 114 thereon. A reference marker or lubber line 115 is provided from an extension 116 of support member 113. A bearing shaft 117 extends upwardly from support member 113 and supports thereon a compass card 118 which includes the usual magnets 119 and 120. The usual jewel (not shown) may be attached to the underside of portion 121 of compass card 118 and rest on the pointed bearing end of shaft 117. Housing 111 is filled with the usual compass damping fluid. Compass card 118 is defined with an outer annular track or raceway 122 in which an indicator ball 123 may roll. The compass card is preferably made of a transparent material. When solenoid 114 is energized the plunger 124 thereof moves a shaft or rod 125 outwardly therefrom to engage the underside of compass card 118 as shown in broken line. Shaft 125 when extended will tilt the compass card 118 so that its lowest portion is adjacent to reference marker 115. Ball 123 will then roll to the lowest portion which is in alignment with reference marker 115. Dependent upon the weight of the marker ball 123 the compass card will tilt slightly towards this position. However, such tilting will not effect the operation of the compass but will tend to maintain the ball at the set position. The shaft 125 is so arranged with respect to the reference marker 115 that it and the reference marker 115 reside in a plane which includes the bearing point of shaft 117. Therefore, when shaft 125 is extended, the lowest point of compass card 118 will always be adjacent reference marker 115.

Figure 14:
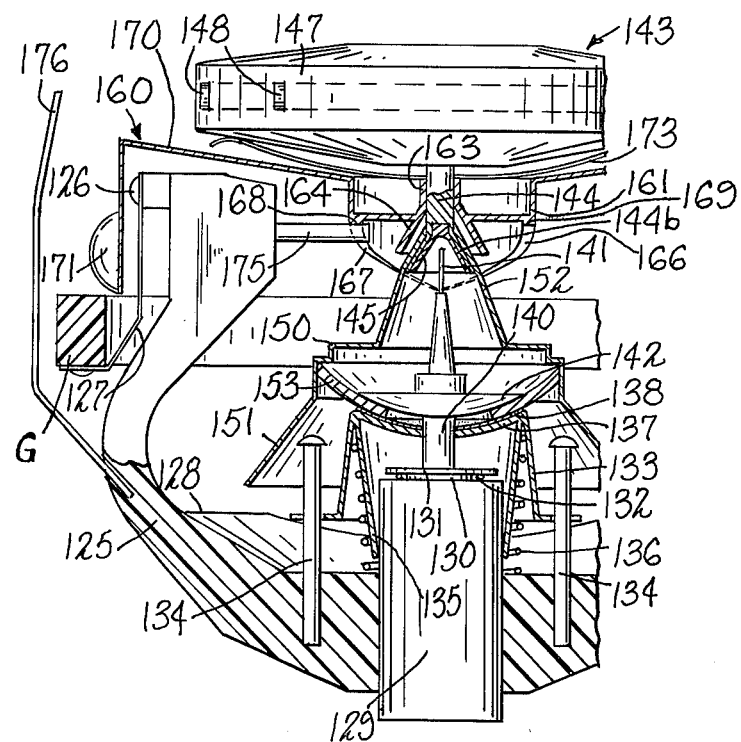
FIG. 14 is a view, partially cut away, similar to FIG. 13 showing the device in a setting position.

FIGS. 12-14 exemplify another preferred embodiment of the invention. Within a sealed housing H comprising a front portion F and a rear portion R is pivotally supported a first gimbal ring G. Gimbal ring G is pivotally mounted to housing portion H on pins P and supported therefrom. A second gimbal member 125 is pivotally supported on pins 126 extending from support members 127 carried on ring G. The axis of pins 126 is essentially perpendicular to the axis of pins P. The housing H is filled with the usual damping fluid.

Gimbal member 125 includes a lower enlarged portion 128 in the form of a dish shape for reasons hereinafter described. Supported within portion 128 is a solenoid 129 having a retractable plunger 130. Plunger 130 includes a spring seat 131 and a return spring 132 thereabout acting between seat 131 and the solenoid housing. A cushioning member 133 is vertically movable on guide pins 134 extending from portion 128, but is rendered non-rotatable by virtue of the two pin arrangement. Member 133 includes an inner portion 135 which is slidable on the housing of the solenoid. A spring 136 is disposed about solenoid 129 and portion 135. Cushioning member 133 has an upper concave surface 137 with a coating or layer of frictional material 138 thereon. A shaft 140 from plunger 130 is movable therewith and carries at its upper end a bearing shaft 141. Also carried on shaft 140 is a retracting or clutch member 142. Supported on bearing shaft 141 is a compass and shaft assembly 143 which comprises a shaft 144 attached to a bearing 145 which bearing rests on bearing shaft 141. Shaft 144 is threaded at one end 144a received in a socket 146 carried in a compass disc 147. Disc 147 a plastic material having magnets 148 therein. Shaft 144 includes a lower flared portion 144b which receives bearing 145 attached to a skirt-like assembly 150. Assembly 150 includes lower skirt portion 151 and an upper conical portion 152 attached to shaft 144. A washer-like member 153 is carried within assembly 150 and is adapted to be contacted by the underside of clutch member 142. When this occurs as shown in FIG. 14, plunger 130 through shaft 140 pulls skirt assembly 151 downwardly into engagement with friction surface 138 so that there will be no rotation of the skirt assembly or shaft 144 at this time. Some tolerance is provided between the underside of member 142 and washer-like member 153. As the plunger retracts with washer-like member 153 in engagement with frictional surface 138 cushioning member 133 also moves down on pins 134 as shown in FIG. 14. This arrangement minimizes any shock on the components due to the fast response of the solenoid plunger.

Disposed about compass shaft 144 is an indicator assembly 160 which comprises a central portion 161 and a hub 163 with a tapered lower portion 164. Tapered portion 164 normally is in engagement with mating tapered portion 144b of assembly 150. Defined on the underside of central indicator portion 161 are guide means in the form of camming surfaces 166 and 167. Such camming surfaces define diametrically opposite high points 168 and 169 (see FIG. 14). The indicator assembly 160 further comprises a radially extending flange 170 having diametrically opposed indicators 171 and 172 (shown 90° out of position in FIG. 13).

A spring 173 is disposed between the top of the indicator 160 will pivot in fixed relation with the compass.

When solenoid 129 retracts shaft 144, through skirt assembly 150, indicator assembly 160 will move therewith and a reference positioning arm 175 will be engaged by surface 166 and 167. This will cause indicator assembly 160 to rotate until arm 175 is at high point 168 or 169. Then one of indicators 171 or 172 is aligned with a reference position marker 176, often referred to as the lubber line. Upon de-energization of the solenoid one of the indicators is positioned on the desired compass course, and the indicator assembly will rotate with the compass shaft.

Figure 15:
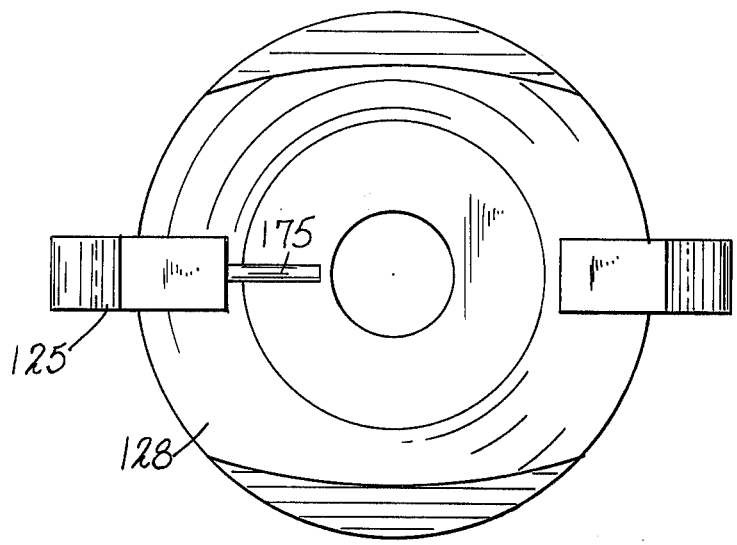
FIG. 15 is a top plan view of a portion of the device of FIG. 12.

For damping purposes the gimbals are constructed of a plastic material such as molded polystyrene having a neutral buoyancy in the compass liquid. The lower portion 128 of gimbal 125 is enlarged in a substantial dish shape (FIG. 15) and is slightly pendulous to damp any tendency to oscillate as shaft 144 rotates as the vessel rocks. The compass assembly is weighted for a substantially neutral buoyancy.

Figure 16:
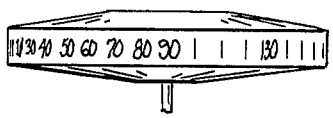
FIG. 16 is a representation of a disc shaft assembly with compass directions marked thereon.

If desired the compass disc may be calibrated in degrees as shown in FIG. 16. The shaft 144 need not include a magnetic compass assembly, but may be connected to a remote master compass by any well known follower arrangement. While the invention has been exemplified in internally gimballed compasses, it will be understood that it may be utilized in externally gimballed compasses, or with any shaft which follows a compass movement.

Another manually operable embodiment of the invention indicating device 200, as shown in FIGS. 17-20, comprises a housing member 201 having a closeable opening 202 to admit damping fluid to the compass and a transparent cover member 203. A gimbal member 204 is pivotally mounted to a support ring 205 within housing member 201. A bearing support shaft 206 extends upwardly from an aperture 207 in gimbal member 204 and has a member providing a shoulder 208 fixed thereto. A spring 209, normally in at least some compression, is disposed about shaft 206 between the shoulder and the gimbal and provides, when not restrained, a means for moving shaft 206 upwardly. Shaft 206 at the upper end thereof carries a bearing 210 for a bearing pivot 211. Bearing pivot 211 is part of a compass assembly 212 which includes a compass card 213 with parallel magnets 214 and 215 mounted thereto. A compass rose providing member 216 defining the points of the compass may be carried on compass card 213.

Card 213, which may be vacuum formed, has an elevated portion 217 with a fractional material such as urethane thereon for braking purposes as hereinafter described. Mounted within elevated portion 217 is a support member 218 for bearing pivot 211 and includes a depending hollow shaft or hub portion 219. Bearing 210 extends within the hollow portion.

Disposed about and carried on shaft or hub 219 of the compass assembly is an indicating assembly 221. Indicating assembly 221 comprises a central sleeve portion 222 about shaft 219 and rests on the lower flange 223 of shaft 219. Sleeve 222 is normally in fixed relation to the compass assembly, due to the indicator riding thereon.

The indicator assembly further includes outwardly extending flanges or arms 224 generally mutually perpendicular. However, a full continuous radial flange may be defined. Extending downwardly from sleeve 222 and flange 223, and in fixed relation with respect thereto, is a camming member 225 defining what may be termed high points 225a with camming edges 225b leading to low points 225c. In the form shown in FIGS. 17 and 18, indicating devices in the form of parallel wires 226 and 227 are mounted to opposed arms 224 and straddle the axis of the compass assembly. The indicating wires are arranged on the indicator assembly with respect to the camming member such that when the camming member and indicating assembly is rotated with respect to the compass assembly, the indicators 226 and 227 will be in a predetermined position with respect to a reference marker. The wires 226 and 227, and the indicating assembly normally rest on and are carried by compass assembly 212 in fixed relation thereto. A centering and retaining ring 228 carried on gimbal member 204 surrounds the compass assembly and indicator assembly.

A lubber line providing reference marker 229 extends upwardly from gimbal member 204. When the indicating assembly is actuated through the camming member 224, the indicating wires will be turned 90° with respect to the position shown in FIG. 17 and will be aligned with and straddle the lubber line providing member 229.

Indicator setting means are provided external of housing 201 and comprise, as more clearly shown in FIG. 19, a shaft 230 journalled in supports 231 and 232, carried in housing 201. An actuating handle 233 is provided on one end of shaft 230. An arm member or members 234 is mounted to shaft 230, and shaft 230 is biased to the position shown in FIG. 18 by one or more springs 235.

An indicator actuating member 236 having spaced-apart arms 237 and 238 straddling gimbal member 204 is pivotally mounted to a pin 239 carried by gimbal member 204. Actuating member 236 is biased toward the position shown in FIG. 18 by springs 240 bearing on pins 241. Pins 241 are carried in the spaced-apart arms 237 and 238 of actuating member 236. Arms 237 and 238 are joined at their free ends by a bridging member 243 which has an upstanding camming member 244. Camming member 244 has an overhanging shoulder 244a adapted to engage shoulder 208 on shaft 206 and hold shaft 206 retracted as shown in FIG. 18. Actuating member 236 is pivoted as shown in FIG. 20. Shoulder 244a, upon movement of member 236 from the position shown in FIG. 18 toward that shown in FIG. 20, releases shoulder 208 and permits spring 209 to move shaft 206 upwardly.

When this occurs, portion 217 of the compass assembly engages a braking member 245 carried on an overhanging extension 246 of gimbal member 204. The undersurface 247 of member 245 may be roughened or coated with a frictional material. When portion 217 of the compass assembly engages the undersurface 247, the compass assembly is prevented from rotating. At this time, as camming member 244 moves upwardly, its upper edge 248 engages the surfaces 225b of camming member 225. As edge 248 continues to move upwardly and bear on surface 225b, camming member 225 and the indicating assembly 221 are rotated with respect to the compass assembly to the position shown in FIG. 20 and the indicating rods now straddle lubber line providing member 229. Thus, the indicating devices are moved to a predetermined position with respect to the reference marker member 229. The helmsman will now steer the vessel on this selected course to maintain the indicating devices 228 in alignment with the reference marker.

Arm member 234 has surfaces 250 which engage surfaces 251 of arms 237 and 238 and act to pivot the actuating member 236 clockwise against the bias of springs 240, as viewed in FIGS. 18 and 20.

When handle 233, which has been depressed to set the indicating assembly is released, springs 235 will move shaft 230 back from the position shown in FIG. 20 to the position shown in FIG. 18, and springs 240 will move the actuating member 236 from the position shown in FIG. 20 back to the position shown in FIG. 18 at which time the overhanging shoulder 245 engages shoulder 208 on shaft 206 and retracts shaft 206 against the bias of spring 209. At this time, the indicator has been set or reset as the case may be with respect to the compass assembly.

FIGS. 22 and 23 show an alternate indicating device 260 having four essentially mutually perpendicular extending arms 261 with indicating indicia 262 and 263 on oppositely disposed arms. Four indicating indicia may be utilized if desired for quadrant cruising or sailing. If this type of indicator should be used, either of the indicia 262 and 263 would be aligned with the lubber line providing member 229 when the indicator assembly was set. The indicator 260 is made of transparent material and has depending flanges 264 which would snugly engage the upstanding flanges 265 on arm 224, while normally resting on card 213.

Member 260 has a central opening 266 therein to fit over raised portion 217 of the compass card.

FIG. 24 shows another indicating device 270 which is also of transparent material and has a depending skirt 271 adapted to engage the upstanding flanges 265 on arms 224. Indicating device 270 is shown in an arbitrary position over the compass rose and mounted to the compass assembly 212. An equilateral siz-pointed star is defined on indicator 270 with lines running continuously between the apexes of the star. Such indicator is quite useful in racing over an olympic course. Once the helmsman sets the first course on the first leg, there would be no need to change the setting for the remaining 60° legs.

For example, if the three-legged olympic course were to start out in a direction indicated by apex 272, then after a given distance require a return course disposed 60° to the port side, the helmsman upon rounding the marker would merely follow the heading indicated by apex 273. Thereafter, the next turn would be a heading 60° from the second leg. The helmsman would then utilize apex 274. The apexes or points may be color coded if desired. The foregoing discussion assumes that initially point 272 is at the lubber line indicator 229.

It will be noted that there is some clearance provided between the upper edge of sleeve 222 and support member 218. As the indicator is set and moves in between the position shown in FIGS. 18 and 19, there will be slight axial movement between the compass assembly and indicating assembly, lifting the indicating assembly off of the compass assembly.

In all of the embodiments disclosed, the compass support shaft is moved axially in one direction or the other to engage a brake or clutch member which prevents rotation of the compass. At this time there is a slight axial movement of the indicating device to decrease the frictional engagement thereof with the compass assembly. In embodiments where a member such as member 243 is movable to the camming surface, the relative axial movement of the indicator and compass assemblies is not required if the frictional force of the brake on the compass assembly is greater than the frictional engagement between the compass and indicator.

It may thus be seen that the objects of the invention set forth as well as those made apparent from the foregoing description are efficiently attained. While several embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A course indicating device comprising a compass adapted to rotate to a predetermined magnetic position, a shaft mounted to rotate with said compass, a reference marker, an indicator normally rotatable in fixed position with said shaft but rotatably positionable with respect thereto, means for moving said shaft axially, and guide means responsive to axial movement of said shaft for rotating said indicator with respect to said shaft and into a predetermined position of alignment with said reference marker.

2. The course indicating device of claim 1 wherein said shaft is axially movable with respect to said indicator to disengage said indicator from said normal fixed position with said shaft.

3. The course indicating device of claim 2 wherein said indicator has said guide means defined thereon, and the indicating device further includes means to engage said guide means and rotate said indicator means upon axial movement of said shaft.

4. The course indicating device of claim 3 further including a bearing supporting said shaft, said bearing connected to said means for moving whereby when said means for moving moves said bearing shaft is disengaged from said normal fixed position with said indicator and said further means engages said guide means and will rotate said indicator means with respect to said shaft unless said indicator is in alignment with said reference marker.

5. The course indicating device of claim 1 further including a housing, gimbal means pivotally mounted within said housing, said gimbal means supporting said means for moving thereon, said means for moving including a bearing supporting said shaft thereon, and a damping liquid filling said housing.

6. The course indicator of claim 5 wherein said means for moving includes a solenoid with plunger, and said solenoid is supported in said gimbal means.

7. The course indicating device of claim 1 wherein said shaft is rotatably supported on a bearing, said means for moving comprises a solenoid having a plunger shaft connected to said bearing, a clutch assembly, a clutch member on said plunger shaft disposed above said assembly and adapted to engage said clutch assembly upon energization of said solenoid, and a brake member disposed below said clutch assembly and clutch member for engaging said clutch assembly to prevent rotation of said shaft when said solenoid is energized.

8. The course indicating device of claim 7 wherein said brake member is resiliently mounted for movement in the direction of movement of said plunger.

9. The course indicating device of claim 1 wherein said indicator includes a hub portion disposed about said shaft.

10. The course indicating device of claim 9 further including means normally biasing said hub portion into engagement with an enlarged portion of said shaft.

11. The course indicating device of claim 1 wherein said guide means are camming surfaces on said indicator and a reference arm engageable with said camming surfaces upon axial movement of said shaft and indicator, whereby said camming surfaces move on said reference arm until said indicator means is in alignment with said reference marker.

12. The course indicating device of claim 1 wherein said means for moving is a spring normally in compression and urging said shaft axially, said guide means comprises a cam surface on said indicator and a cam actuating member normally holding said spring in compression.

13. The course indicating device of claim 12 wherein braking means are provided above said compass assembly, and said spring upon release by said cam actuating member moves said compass assembly into engagement with said braking means.

14. The course indicating device of claim 13 further including a housing for said course indicating device, means pivotally mounting said cam actuating member in said housing, and means exterior of said housing for operating said actuating member.

15. A course indicating device comprising a compass, a shaft rotatably mounted to follow the position of said compass, means providing a reference marker, an indicator normally movable with said shaft but rotatably positionable with respect thereto, a guide means for rotating said indicator, means for producing relative axial movement of said shaft and said indicator, means responsive to said relative movement to engage said guide means and rotate said indicator relative to said shaft to a predetermined position of alignment with said reference marker.

16. The course indicating device of claim 15 wherein said indicator device includes a hub portion disposed about said shaft and normally in frictional contact with said shaft, a bearing shaft supporting said shaft thereon, a member disposed about said shaft and having upper camming surfaces defining said guide means, and said means for moving retracts said bearing shaft so that said indicator engages said camming surfaces.

17. The course indicating device of claim 16 wherein said indicator further includes at least one rod-like member extending radially from said shaft having an indicator marker on the end thereof adapted to cooperate with said reference marker, said at least one rod-like member engaging said camming surfaces upon retraction of said bearing shaft.

18. The course indicating device of claim 15 wherein said indicator has an indicating marker adapted to be aligned with said reference marker, said guide means including camming means adapted to rotatably move said indicator device into a predetermined position where it is aligned with said reference marker upon said relative movement.

19. The course indicating device of claim 18 further including braking means for preventing rotation of said shaft as said camming means moves said indicating device.

20. A course indicating device comprising a housing member having a viewing window defined therein, a reference marker in fixed relation to said housing member, a compass assembly rotatably mounted within said housing, an indicator normally in contact with and movable with said compass assembly but rotatable with respect thereto and adapted to cooperate with said reference marker, said indicator including a hub portion disposed about said compass assembly and movable axially with respect thereto, positioning means on said hub portion for causing said indicator to rotatably move with respect to said compass assembly to a predetermined position where said indicating means is aligned with said reference marker upon relative axial movement of said compass assembly and said indicating device, and means for moving said compass assembly axially relative to said indicating device so that said positioning means causes said indicating device to rotate to said predetermined position, said indicating device being viewable in said window in alignment with said reference marker when rotated to said predetermined position.

21. The course indicator of claim 20 wherein said window is located for essentially horizontal viewing, and said compass assembly is rotatable about a vertical axis.

22. A course indicating device comprising a rotatably mounted compass assembly, means providing a reference marker, an indicator normally in contact and movable with said compass assembly but relatively movable axially and rotatably with respect thereto, means for relatively axially moving said compass assembly with respect to said indicator, and positioning means responsive to relative axial movement of said compass assembly with respect to said indicator for rotatably moving said indicator into a predetermined position of alignment with said reference marker, whereby when said compass assembly is returned to its original position said indicator is in contact and movable with said compass assembly.

23. The course indicating device of claim 22 wherein said means for moving comprises a solenoid for moving said compass assembly.

24. A course indicating device comprising a compass assembly including a shaft, means supporting said shaft for rotational movement of said compass assembly, an indicator normally in engagement with said compass assembly and movable therewith, said indicator being rotatable with respect to said shaft upon axial disengagement from said compass assembly, means for moving said compass assembly in a first axial direction with respect to said indicator to disengage said indicator, means responsive to axial movement of said compass assembly in said first direction to engage and produce rotation of said indicator to a predetermined angular position so that when said shaft is axially returned said indicator re-engages said compass assembly while in said predetermined angular position.

25. A course indicating device comprising a compass, a rotatably mounted shaft arranged to follow the position of said compass, means providing a reference marker, an indicator normally movable with said shaft but rotatably positionable with respect thereto, and positioning means for causing said indicator device to move rotatably with respect to said shaft into a predetermined position of alignment with said reference marker, said indicator device comprising a rod-like member having a universally pivotal connection to said shaft at one end thereof and an indicator marker at the other end thereof adapted to be aligned with said reference marker, said positioning means comprising a pivotal lever having spaced apart arms adapted to pivot and engage said indicator device and pivot it on said universal connection to said predetermined position with respect to said reference marker.

26. The course indicating device of claim 25 wherein said lever is pivotal about an axis perpendicular to the axis of said compass assembly, and said reference member is in a plane which is intermediate said arms.

27. The course indicating device of claim 26 wherein the ends of said arms are joined by a connecting member having a low point defined therein, whereby as said positioning means pivots said rod-like member moves to said low point, said low point predetermining the position of alignment of said indicator device with said reference marker.

28. A course indicating device comprising a rotatably mounted compass assembly, a reference marker, an indicator normally movable with said compass assembly but rotatably positionable with respect thereto, positioning means for causing said indicator to move rotatably with respect to said compass assembly into a predetermined position of alignment with said reference marker, said positioning means including guide means for predetermining movement of said indicator to a position of alignment with said reference marker, and means for actuating said positioning means, said guide means including an annular track on said compass assembly, said indicator located in said track and rollable therein, said positioning means comprising means for tilting said compass assembly on its pivot so that said indicator rolls to a point in said track in alignment with said reference marker.

29. The course indicating device of claim 28 wherein the mounting of said compass assembly is a bearing shaft, said reference marker, the axis of said bearing shaft and said means for tilting reside in a common plane.

30. A course indicating device comprising a compass assembly, a bearing shaft rotatably supporting said compass assembly, a housing enclosing said compass assembly and shaft, means for retracting said bearing shaft whereby said compass assembly moves downwardly, a reference marker defined in fixed relation to said housing, an indicator on said compass assembly and normally movable therewith but movable axially and rotatively with respect to said compass assembly, and indicator positioning means disposed in said housing and positioned to engage said indicator when said compass assembly moves axially with respect to said indicator and rotate said indicator to a position of alignment with said reference marker.

31. The course indicating device of claim 30 wherein said positioning means comprises camming surfaces defined on said indicator device having a high point and an arm within said housing whereby as said indicator camming surfaces move axially with said compass assembly said arm engages said surfaces and rotates said indicator with respect to said compass assembly until said arm reaches said high point.

32. The course indicating device of claim 31 wherein said compass assembly includes a shaft portion, said indicator device is supported on said shaft portion, said indicator device having a downwardly extending cylindrical portion terminating in said camming surfaces.

33. The course indicator of claim 30 wherein said positioning means comprises a member in said housing providing camming surfaces having a low point, said indicator device including an arm adapted to engage said camming surface when said compass assembly moves axially whereby said arm moves on said camming surfaces to said low point.

34. The course indicator of claim 33 wherein said compass assembly includes a shaft portion, said indicator device is normally supported on said shaft portion above said camming surfaces.

35. The course indicator of claim 30 wherein said housing is filled with a damping liquid, and has a transparent window therein to view said indicator device in relation to said reference marker.

36. A course indicating device comprising a compass assembly, support means rotatably mounting said compass assembly, a reference marker, an indicator normally rotatable in fixed position with said compass assembly but rotatably positionable with respect thereto, braking means for preventing rotation of said compass assembly, said braking means being normally out of engagement with said compass assembly, means for moving said compass assembly into contact with said braking means to provide rotation of said compass assembly, engaging means for moving upwardly and engaging said indicator when said compass assembly is braked, and guide means on said indicator engageable by said engaging means upon said upward movement thereof to rotate said indicator to a predetermined position with respect to said reference marker.

37. The course indicating device of claim 36 wherein said means for moving is a spring which moves said support means and said compass assembly axially.

38. The course indicating device of claim 37 wherein said spring is normally in compression urging said support means axially, and said means for engaging said guide means normally holds said spring in compression but is movable to engage said indicator guide means while releasing said spring.

39. The course indicating device of claim 38 wherein said engaging means is a pivotally mounted member normally biased to a position to hold said spring in compression, said guide means is a camming surface, said engaging means further including means for pivoting said member to a position to engage said indicator camming surface.

40. The course indicating device of claim 36 wherein said braking means overlies said compass assembly, and said compass assembly includes a raised portion arranged to contact said braking means.

41. The course indicating device of claim 36 further including a housing, said support means comprises a shaft supported in said housing for axial movement, a spring retained in compression arranged to act axially on said shaft, said indicator disposed about said compass assembly and movable axially with said compass assembly, said braking means overlying said compass assembly, a lever pivotally mounted in said housing and having a portion thereof retaining said spring in compression, said means for engaging said indicator comprising a portion of said lever, means biasing said lever to a position to retain said spring in compression, and means for pivoting said lever to a position to release said spring whereby said compass assembly is moved into contact with said braking means and said portion of said lever engages said indicator and rotates said indicator to said predetermined position.

42. The course indicating device of claim 37 wherein said indicator includes an equilateral six pointed star on a transparent member overlying the rose of said compass assembly.

43. The course indicating device of claim 37 wherein said indicator includes a transparent member overlying the rose of said compass assembly and at least one reference mark adapted to be aligned with said reference marker is defined on said transparent member.

* * * * *

UNITED STATES PATENT AND TRADEMARK OFFICE
CERTIFICATE OF CORRECTION

PATENT NO. : 4,089,118
DATED : May 16, 1978
INVENTOR(S) : BERNARD HOWARD

It is certified that error appears in the above-identified patent and that said Letters Patent are hereby corrected as shown below:

Column 6, line 27, delete "A support member".

Column 6, line 28, delete in its entirety.

Column 7, line 24, after "Disc 147" insert --is--.

Column 7, line 57, after "cator", insert --assembly and compass disc 148 so that normally the indicator--.

Column 8, line 38, change "fractional" to --frictional--.

Claim 17, line 4, "indicator" should read --indicating--.

Column 15, line 4, change "provide" to --prevent--.

Claim 42, line 1, "37" should read --36--.

Claim 43, line 1, "37" should read --36--.

Signed and Sealed this

Twenty-first Day of November 1978

[SEAL]

Attest:

RUTH C. MASON
Attesting Officer

DONALD W. BANNER
Commissioner of Patents and Trademarks